(12) United States Patent
Noh et al.

(10) Patent No.: US 9,053,453 B2
(45) Date of Patent: Jun. 9, 2015

(54) SYSTEM AND METHOD FOR MANAGING SECURED BELONGINGS

(71) Applicant: Samsung SDS Co., Ltd., Seoul (KR)

(72) Inventors: Han Gyul Noh, Yongin-si (KR); Min Chul Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 13/955,524

(22) Filed: Jul. 31, 2013

(65) Prior Publication Data
US 2014/0034729 A1   Feb. 6, 2014

(30) Foreign Application Priority Data

Jul. 31, 2012 (KR) .......................... 10-2012-0083894

(51) Int. Cl.
G06F 19/00 (2011.01)
G06Q 10/08 (2012.01)

(52) U.S. Cl.
CPC .................................... *G06Q 10/087* (2013.01)

(58) Field of Classification Search
USPC ........................ 235/385, 380, 462.09, 462.1
See application file for complete search history.

(56) References Cited

U.S. PATENT DOCUMENTS 7,207,481 B2 * 4/2007 Barenburg et al. ........... 235/381
8,052,058 B2 * 11/2011 He ............................. 235/462.09
8,052,061 B2 * 11/2011 Warther ....................... 235/492
8,505,809 B2 * 8/2013 Steusloff et al. ............. 235/375

FOREIGN PATENT DOCUMENTS

KR   10-2004-0064476 A   7/2004

* cited by examiner

*Primary Examiner* — Daniel St Cyr
(74) *Attorney, Agent, or Firm* — Sughrue Mion, PLLC

(57) ABSTRACT

Provided are a system and method for managing belongings of a user who enters or exits from a secure region. The system includes a user identification tag including first identification information about a user of the belongings; an identification code generator generating a two-dimensional (2D) identification code including second identification information based on information about the belongings, a labeling device outputting the 2D identification code to a label, and a security management server mapping the first identification information with the second identification information and storing the same, wherein the label is attached to the belongings, and when the label is detached from the belongings, the 2D identification code is damaged.

20 Claims, 11 Drawing Sheets

FIG. 4,

SYSTEM AND METHOD FOR MANAGING SECURED BELONGINGS

CROSS-REFERENCE TO RELATED APPLICATION

This application claims priority from Korean Patent Application No. 10-2012-0083894 filed on Jul. 31, 2012 in the Korean Intellectual Property Office, the disclosure of which is incorporated herein by reference in its entirety.

BACKGROUND OF THE INVENTION

1. Field of the Invention

The present invention relates to a system and method for managing secured belongings, and more particularly, to a system and method for managing belongings of a user who enters or exits from a secure region.

2. Description of the Related Art

In general, a bar code is a combination of letters and/or digits represented in black-and-white bar shaped symbols and is used to be easily read by a computer and to rapidly input data to the computer. Such an identification code is automatically scanned using an optical mark scanner to read predetermined information. For example, the bar code may be used to indicate types of commodity items complying with the universe product code (UPS) system or a Point Of Sales system (POS) of a wholesale shop or a retail shop.

Recently, a two-dimensional (2D) bar code having a black-and-white or colored lattice pattern and representing particular information in a matrix type, such as a QR code, a Microsoft (MS) Tag, etc. has been proposed. The proposed 2D bar code can be more actively used because it can represent a larger amount of information than the conventional bar code.

In order to prevent technology leakage or maintain security of an enterprise, a secure region is established and managed, and identity and belongings of a user who enters/exits from the secure region (to be simply referred to as the user, hereinafter) are checked.

In the conventional field of the related art, a seal sticker label is attached to secure belongings, for example, a photographing lens of a camera or a smart phone, thereby preventing a secret of a secure region from being photographed and preventing storage media or documents from being taken in or out to prevent the documents from being illegally copied to the storage media.

However, in a case where the seal sticker is optionally tampered with or detached from a predetermined location of the secured belongings and then reattached to the predetermined location of the secured belongings by the user, a security official had to visually inspect the tampering of the secure region. Thus, even if there is a damaged seal sticker, it is quite difficult to evidently detect the damaged seal sticker. That is to say, even if a seal sticker label is damaged by being detaching from and reattached to the secured belongings, the vigilance of the security official may be eluded in tense situations and moments.

In addition, the conventional seal sticker can be easily counterfeited. Further, in a case where the secured belongings are tampered and used to then be discarded, the counterfeited seal sticker on the secured belongings cannot be detected, making it difficult to achieve reinforced security.

Even if the conventional seal sticker label is damaged by being detaching from and reattached to the secured belongings, the vigilance of the security official may be eluded in tense situations and moments. However, when the secured belongings are tampered with and used to then be discarded by the user, it is not possible to determine whether there are any secured belongings or not.

SUMMARY OF THE INVENTION

The present invention provides a system and method for managing secured belongings, the system including a security sticker including a new identification code including information about a user who enters or exits from the secure region and/or information about the belongings.

The present invention also provides a system and method for managing secured belongings, which can easily determine whether a user who enters or exits from a secure region optionally detaches an identification code or a security sticker from the secured belongings and then reattach the identification code or the security sticker to the belongings.

The present invention also provides a system and method for managing secured belongings, which can easily determine whether the secured belongings taken in or out by a user who enters or exits from a secure region are tampered and used to then be discarded or counterfeited to be reattached.

The above and other objects of the present invention will be described in or be apparent from the following description of the preferred embodiments.

According to an aspect of the present invention, there is provided a system for managing secured belongings, the system including a user of the belongings, an identification code generator generating a two-dimensional (2D) identification code including second identification information based on information about the belongings, a labeling device outputting the 2D identification code to a label, and a security management server mapping the first identification information with the second identification information and storing the same, wherein the label is attached to the belongings, and when the label is detached from the belongings, the 2D identification code is damaged.

According to another aspect of the present invention, there is provided a system for managing secured belongings, the system including a user identification tag including first identification information about a user of the belongings, a two-dimensional (2D identification code attachable to the belongings and including second identification information that is information about the belongings, a reader reading the user identification tag and the 2D identification code, extracting the first identification information and the second identification information and generating read information, and a security management server receiving and analyzing the read information, wherein the first identification information includes third identification information that is information about the belongings, and the security management server determines whether the third identification information of the first identification information and the second identification information are identical with each other.

According to still another aspect of the present invention, there is provided a method for managing secured belongings, the method including receiving a request for entrance to a secure region from a user of belongings, recognizing first identification information including personal information about the belongings' user and first information about the belongings, extracting second identification information that is second information about the belongings, generating a 2D identification code including the second identification information, attaching the 2D identification code to the belongings, and mapping the first identification information with the second identification information and storing the same.

As described above, in the system and method for managing secured belongings according to the embodiments of the present invention, unlike the conventional security sticker, the system includes a security sticker including a new identification code in a two-dimensional (2D) bar code form including information about a user who enters or exits from the secure region and/or information about the belongings, thereby achieving reinforced security.

In addition, in a case where a user who enters or exits from a secure region optionally detaches an identification code or a security sticker from the secured belongings, the 2D identification code may be damaged, so that it cannot be scanned by a reader, thereby easily determining whether the secured belongings are counterfeited or forged or not.

Further, in the system and method for managing secured belongings according to the embodiments of the present invention, the 2D identification code can be prevented from being illegally counterfeited/forged and copied by concealing the 2D identification code so as not to be visually identified for preventing counterfeiting/forging acts, such as user's alteration of information about the secured belongings through counterfeiting or forging the 2D identification code, by inserting an encryption key to prevent the 2D identification code from being counterfeited/forged, or by discoloring the 2D identification code when the 2D identification code is illegally copied.

Further, in the system and method for managing secured belongings according to the embodiments of the present invention, personal information about the user and information about the belongings are mapped together and managed at the same time, thereby easily determining whether the secured belongings taken in or out by a user who enters or exits from a secure region are tampered and used to then be discarded or counterfeited to be reattached.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a system for managing secured belongings according to embodiments of the present invention will be described with reference to FIGS. 1 to 4. FIGS. 1 to 4 are schematic diagrams of a system for managing secured belongings according to embodiments of the present invention.

Figure 1:
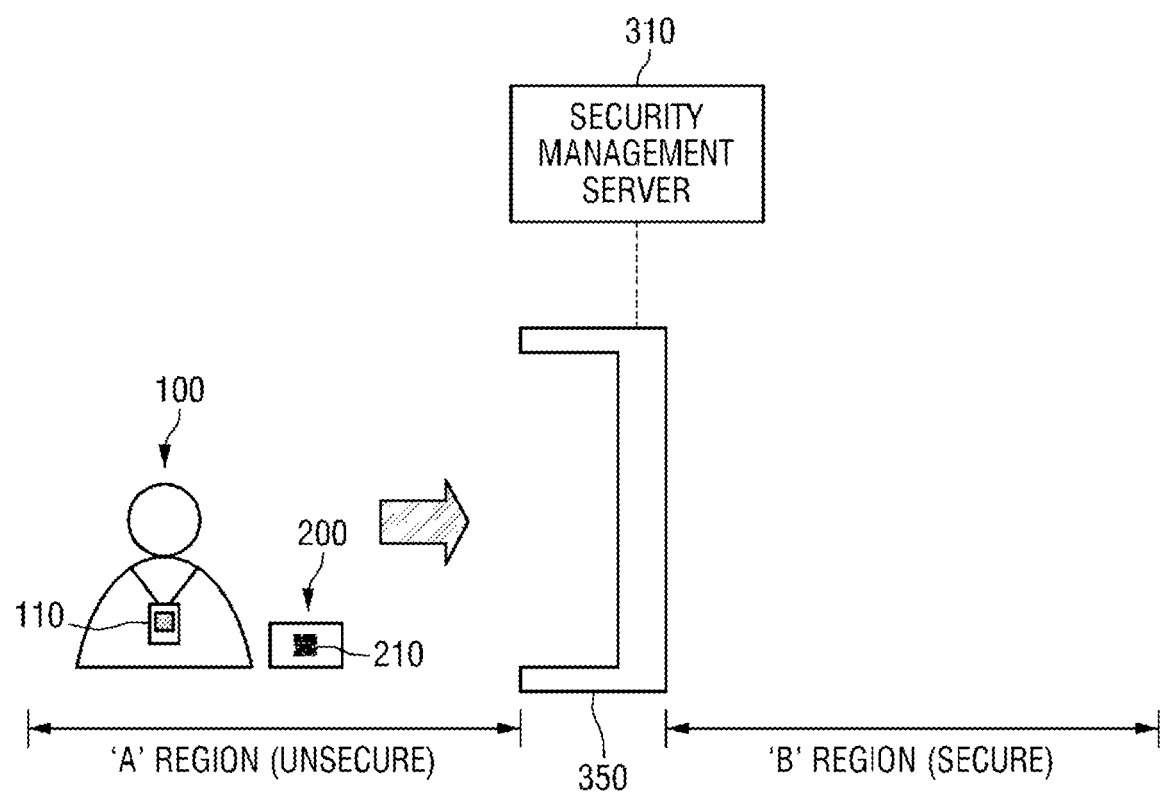
FIGS. 1 to 4 are schematic diagrams of a system for managing secured belongings according to embodiments of the present invention.
Figure 2:
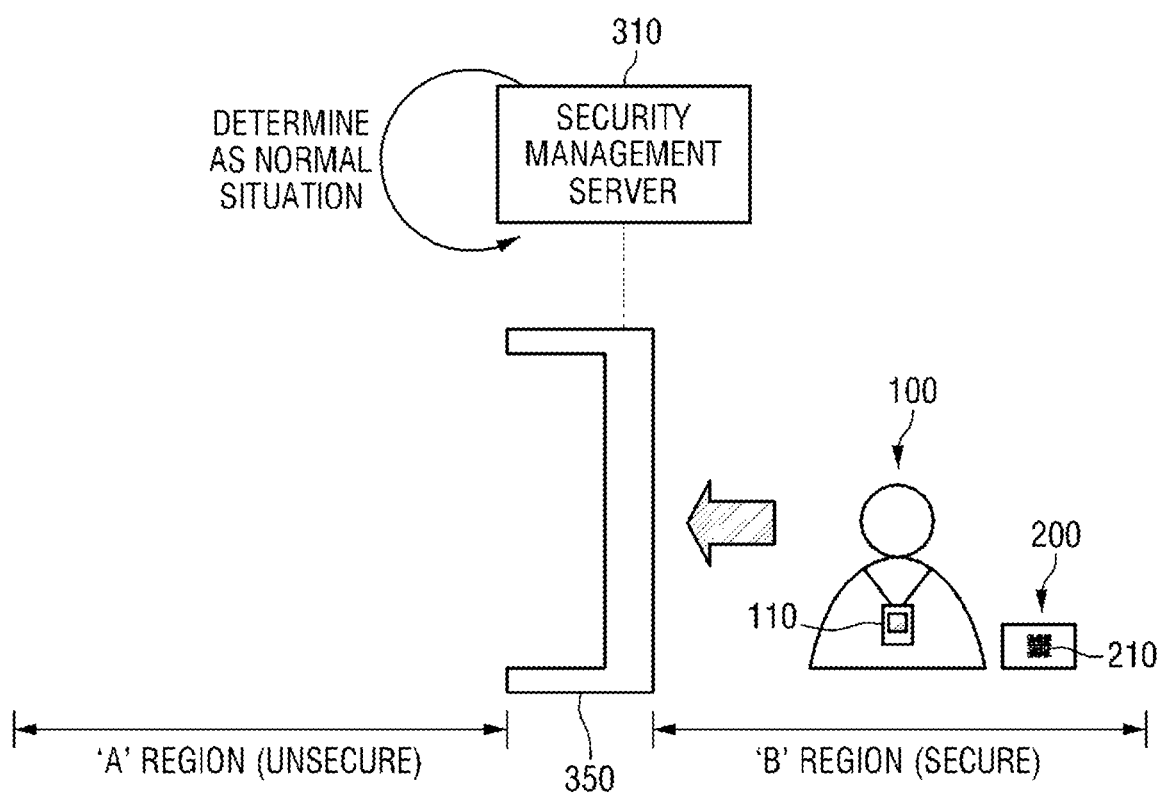

Referring to FIGS. 1 and 2, the secured belongings management system according to an embodiment of the present invention may include a security management server 310, and a blocking device 350 isolating an 'A' region (unsecure region) and a 'B' region (secure region). The secured belongings management system may include a user identification tag 110 including identity information about a user 100 who enters or exits from the secure region, and a 2D identification code 210 attached to belongings 200 possessed by the user 100.

When the user 100 intends to enter/exit from the B region (secure region), it is necessary for the user 100 to pass the blocking device 350 managed by the security management server 310 and a security check procedure is performed based on data represented by the user identification tag 110 and the 2D identification code 210.

The user identification tag 110 may be an IC chip embedded into an object indicating the identity and part of personal information of the user 100, such as a pass, an identification certificate, an employee certificate, etc., an RFID tag or a bar code. In some other embodiments of the present invention, the same type identification code as the 2D identification code 210 may be used as the user identification tag 110.

The user identification tag 110 may include an ID for identifying the user 100 or an intrinsic ID number, such as a resident registration number.

The 2D identification code 210 includes all types of 2D bar codes having a black-and-white or colored lattice pattern and representing particular information in a matrix type, such as a QR code, a Microsoft (MS) Tag, etc. For the sake of convenient explanation, the present invention will be described with regard to a case where the 2D identification code 210 is a QR code, by way of example.

The first identification information and the second identification information included in the user identification tag 110 and the 2D identification code 210 may be read by a predetermined reader or may be manually transmitted to the security management server 310 by a security manager. The security management server 310 may store the received data and may generate security data.

The 2D identification code 210 may include data concerning information about the belongings, including, for example, a product name, a product code, a manufacture data, a classification code, standards, and so on. In some other embodiments, the 2D identification code 210 may include information about the user who takes the belongings into the secure region. That is to say, some of information of the user identification tag 110 may be included in the 2D identification code 210.

Accordingly, it is possible to determine based on the 2D identification code 210 who has taken the belongings 200 into the secure region. If information about a person who currently enters and exits from the secure region to take the belongings 200 into/out of the secure region is different from information about the belongings' user who takes the belongings into the secure region, which is stored in stored in the security management server 310, the current situation is determined to be abnormal.

Conversely, identification information about the belongings 200 may be included in the issued user identification tag 110. That is to say, some of information about the 2D identification code 210 may be included in the user identification tag 110.

As shown in FIG. 2, if the user 100 intends to exit to the A region (unsecure region) after completing a predetermined operation in the B region (secure region) within the blocking device 350, a predetermined security check procedure is performed. That is to say, it is determined whether the identification information stored in the security management server 310 during an entrance procedure and the current identification information are identical with each other, and if yes, the security management server 310 determines that the current situation is a normal situation, and cancels the blocking device 350 to allow the user 100 to exit from the secure region through blocking device 350.

Figure 3:
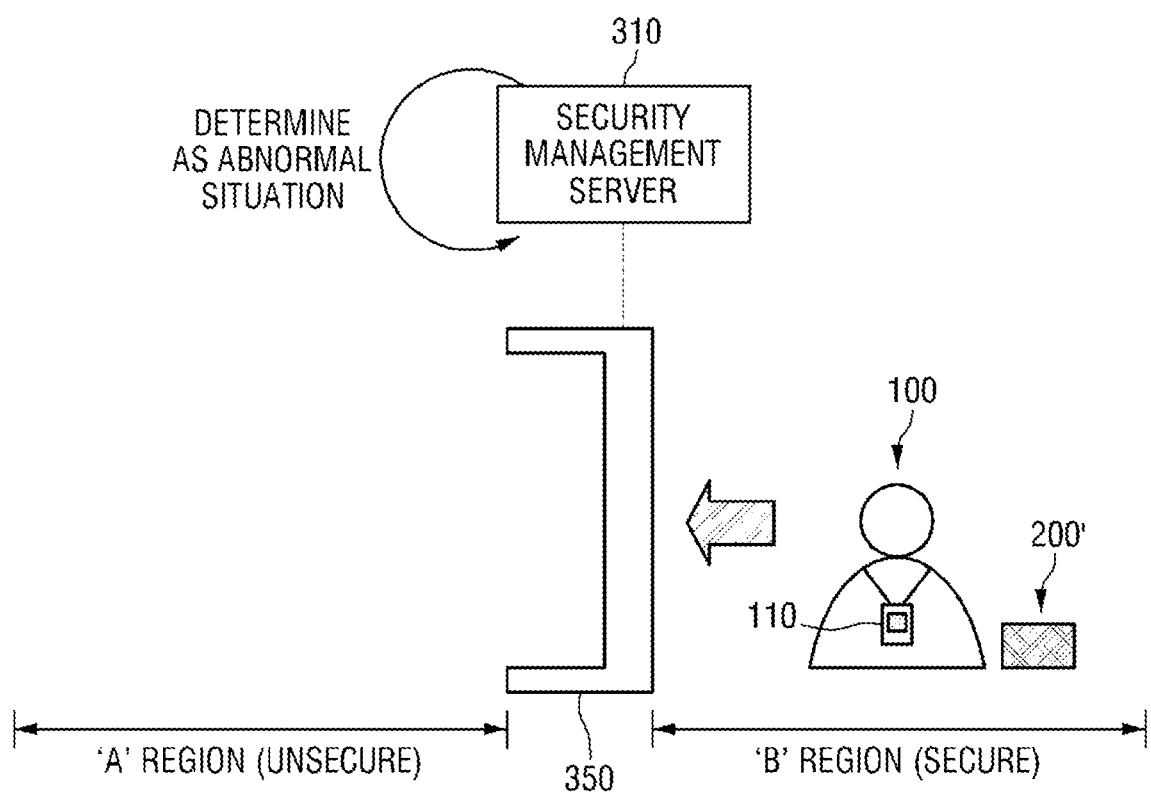
Figure 4:
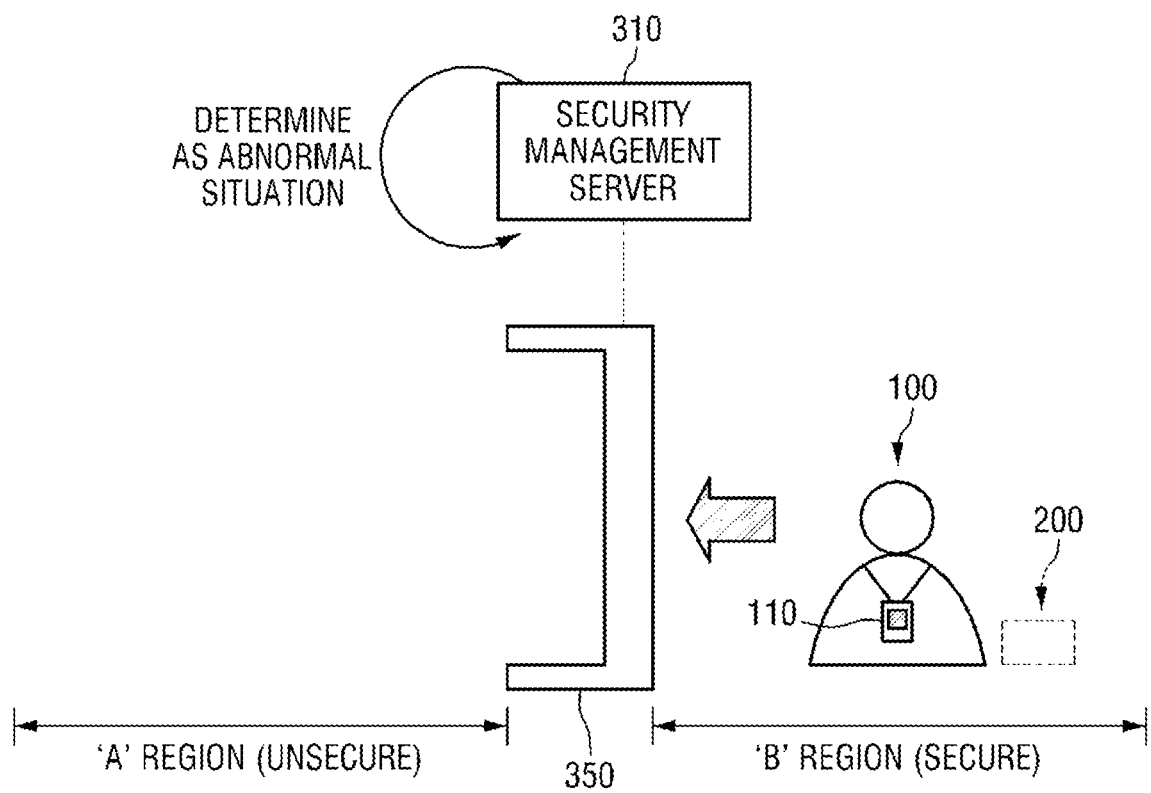

Meanwhile, as shown in FIGS. 3 and 4, in a case where the user 100 intends to exit to the A region (unsecure region) after completing a predetermined operation in the B region (secure region) within the blocking device 350, if the 2D identification code 210 attached to the belongings 200 is damaged or tampered with (FIG. 3), if the belongings 200 are discarded or lost (FIG. 4), the security management server 310 determines that the current situation is an abnormal situation, and actuates the blocking device 350 to prevent the suspicious user 100 from exiting from the secure region.

The conventional system had only to check whether a seal sticker attached to belongings is damaged or not. Therefore, if the belongings are discarded, suggesting that there is no seal sticker, the conventional system cannot determine that the current situation is abnormal. However, the system according to the embodiment of the present invention may determine whether there are belongings 200 targeted for the security check procedure and whether the belongings 200 are damaged during the entrance or exit procedure by managing the information about the user 100 and the information about the belongings 200 at the same time.

Figure 5:
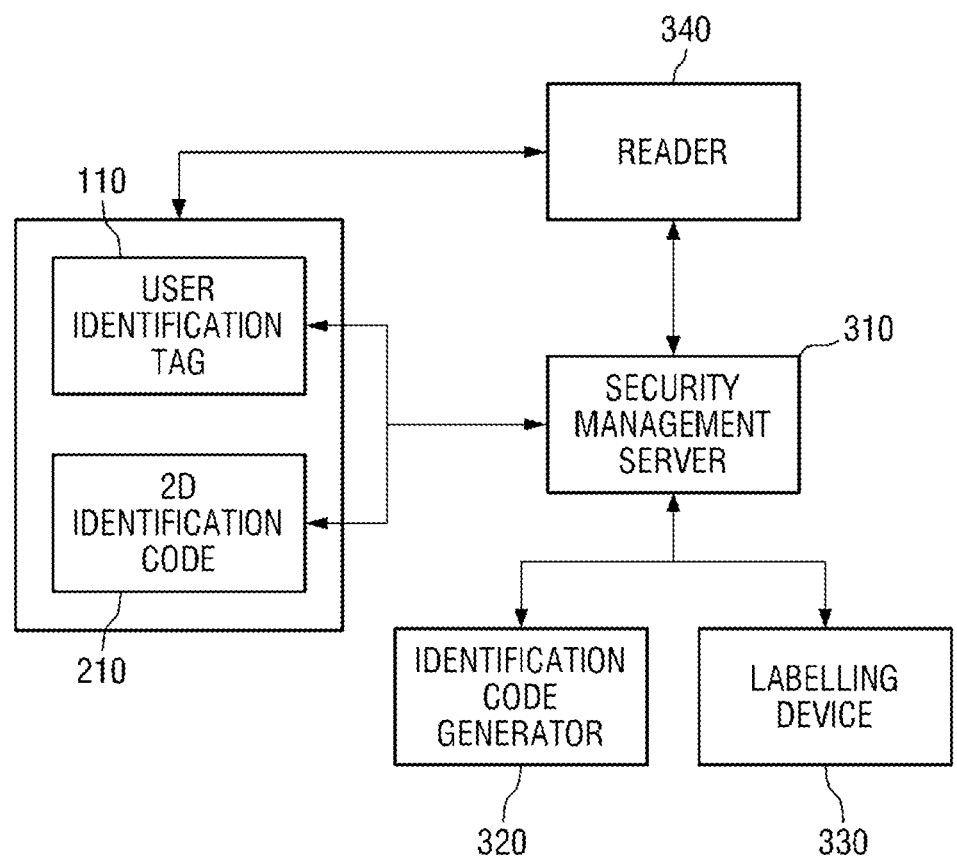
FIG. 5 is a block diagram of a system for managing secured belongings according to embodiments of the present invention.
Figure 6:
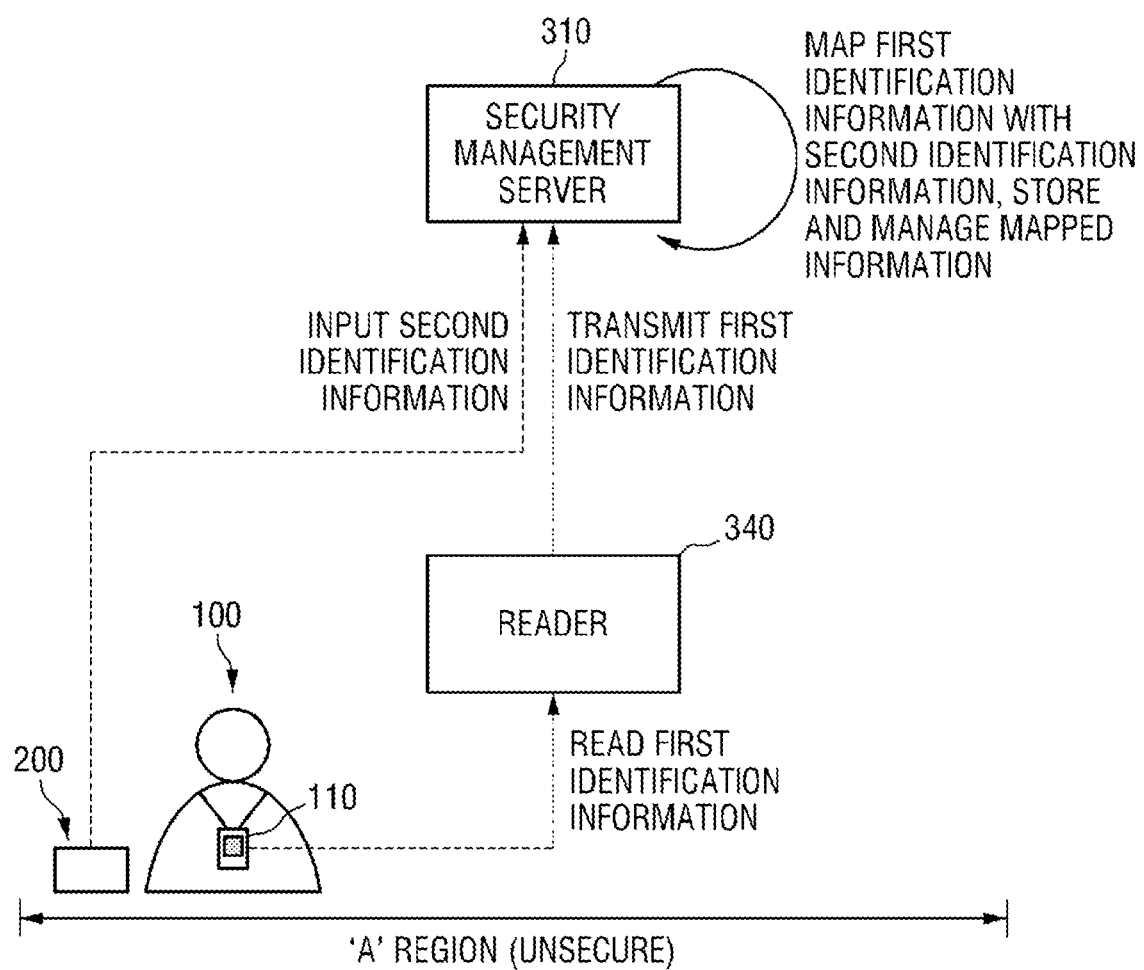
FIGS. 6 and 7 illustrate an entrance management sequence in an unsecure region of a system for managing secured belongings according to an embodiment of the present invention.
Figure 7:
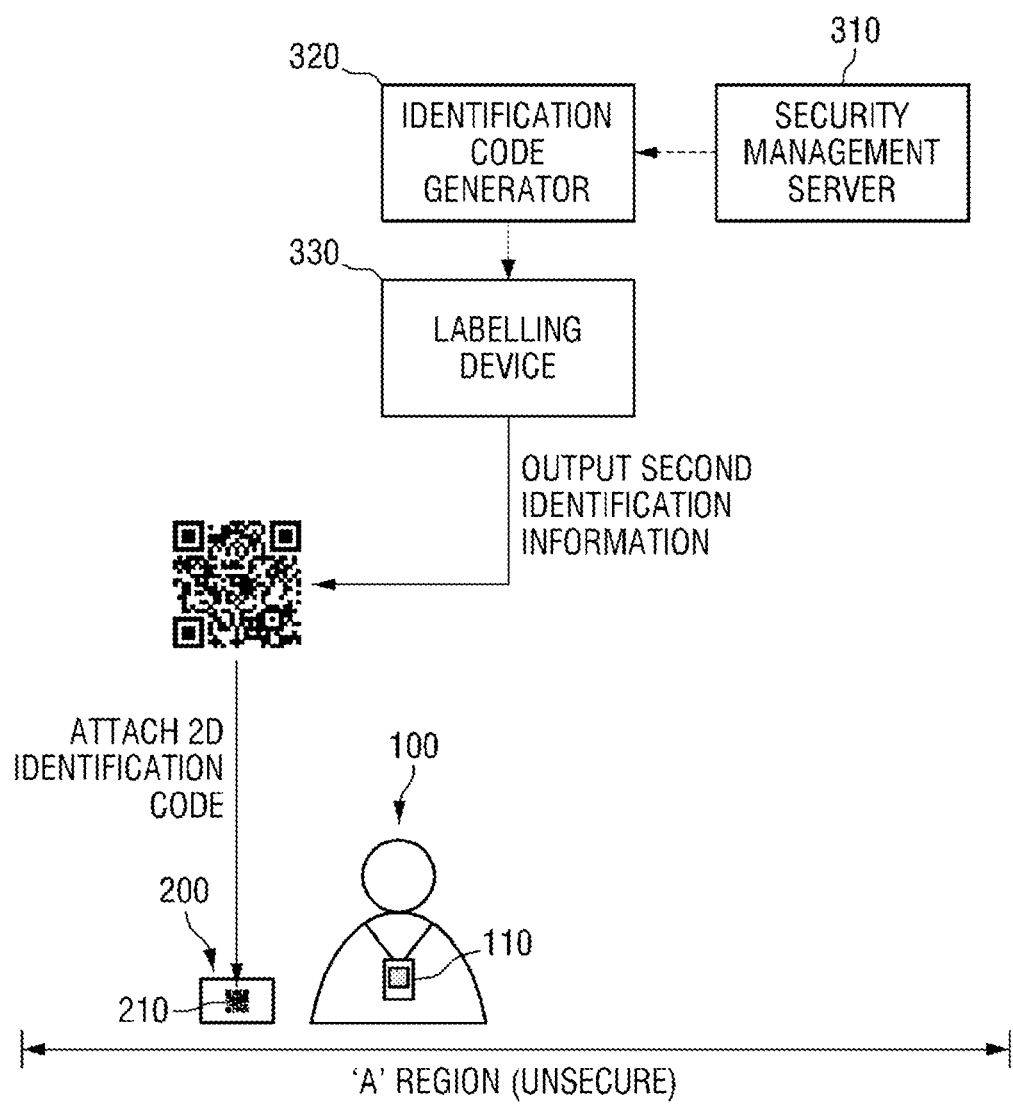
Figure 8:
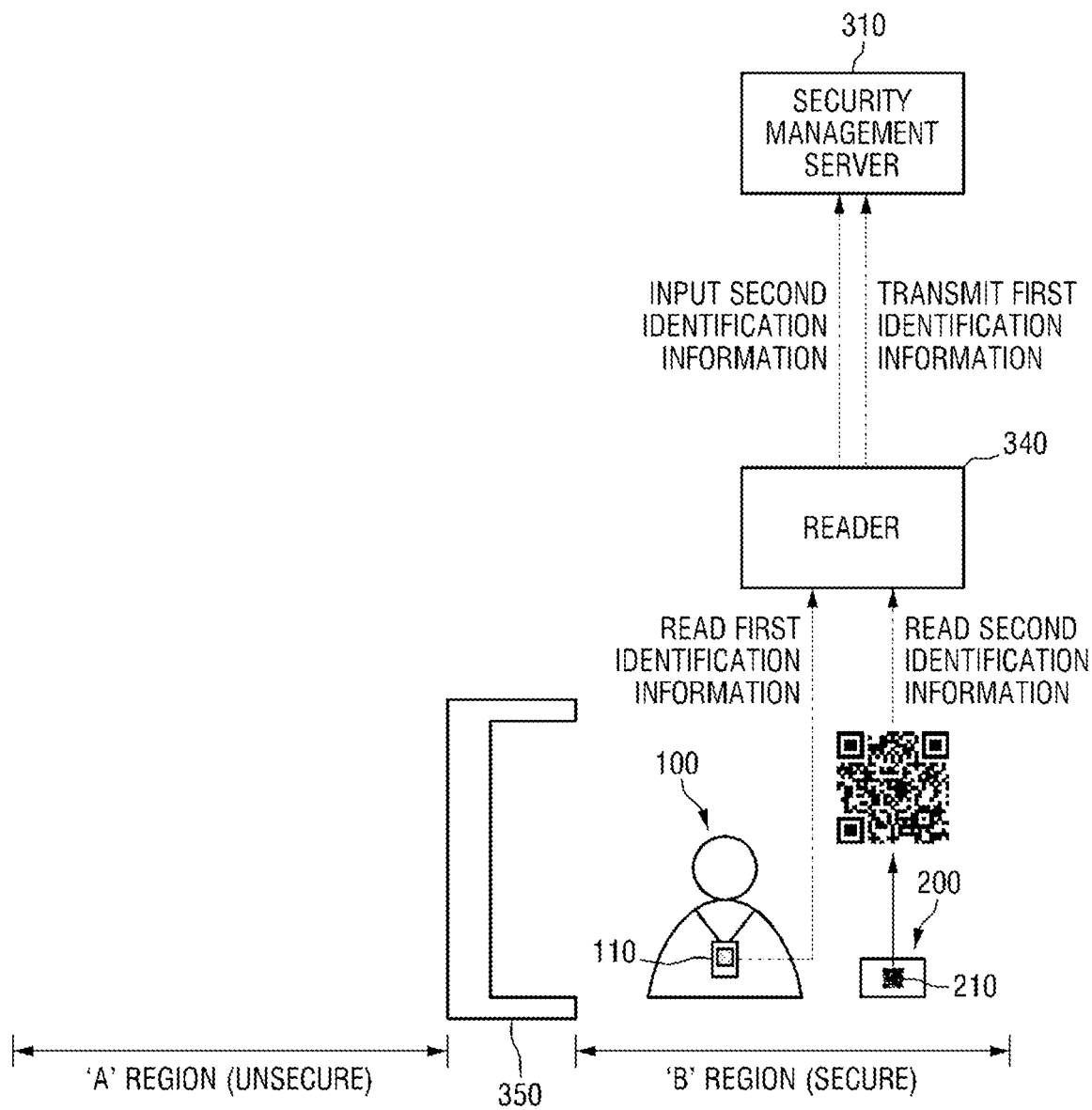
FIGS. 8 and 9 illustrate an exit management sequence in a secure region of system for managing secured belongings according to an embodiment of the present invention.
Figure 9:
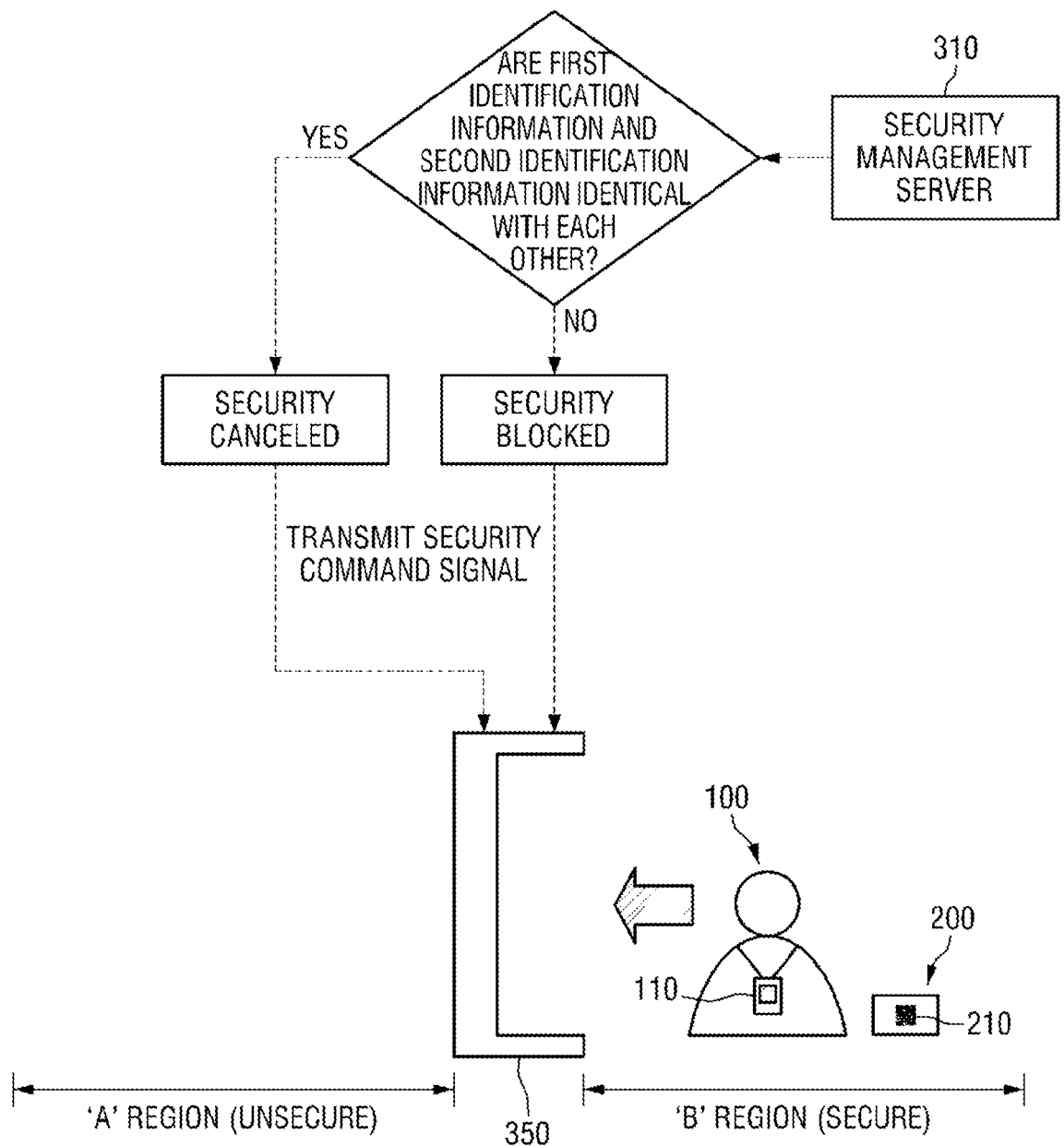

Hereinafter, the configuration and operating principles of the secured belongings management system according to the embodiment of the present invention will be described with reference to FIGS. 5 to 9. FIG. 5 is a block diagram of a system for managing secured belongings according to embodiments of the present invention, FIGS. 6 and 7 illustrate an entrance management sequence in an unsecure region of a system for managing secured belongings according to an embodiment of the present invention, and FIGS. 8 and 9 illustrate an exit management sequence in a secure region of system for managing secured belongings according to an embodiment of the present invention.

Referring to FIG. 5, the secured belongings management system according to an embodiment of the present invention may include a user identification tag 110 including first identification information about the user 100 of the belongings 200, an identification code generator 320 generating a 2D identification code 210 including second identification information based on information about the belongings 200, a labeling device 330 outputting the 2D identification code 210 to a label, and a security management server 310 mapping the first identification information with the second identification information and storing the same. The label is attached to the belongings 200, and if the label is detached from the belongings 200, the 2D identification code 210 is damaged.

Since the user identification tag 110 and the 2D identification code 210 have been previously described, repeated descriptions thereof will be omitted.

The security management server 310 receives first identification information and second identification information read from the user identification tag 110 and the 2D identification code 210, maps the two pieces of information and stores the mapped information.

The security management server 310 may be provided in close proximity to the secure region, and may be connected to the blocking device 350 in a wireless or wired manner to manage opening/closing of the blocking device 350. The security management server 310 may be a general server providing predetermined information in response to a client's connection request and may be connected to the identification code generator 320, the labeling device 330, and the reader 340 to control the respective elements.

The security management server 310 may include a database for managing and storing the received first identification information and second identification information. The database may be incorporated into the security management server 310 or may be separately provided, and may be connected to the security management server 310.

The security management server 310 provides the same identification key for mapping the received first identification information with the second identification information, thereby checking the mapped second identification information when the first identification information is checked.

The identification code generator 320 may generate the 2D identification code 210 including the second identification information based on the information about the belongings 200. In the present embodiment, the identification code generator 320 may be provided separately from the security management server 310, but aspects of the present invention are not limited thereto. The identification code generator 320 may be incorporated into the security management server 310. In some other embodiments, the identification code generator 320 may be combined with the labeling device 330 to be described later to then be represented as a single component.

The identification code generator 320 receives the second identification information, that is, the information about the belongings 200, from the security management server 310, and may generate the 2D identification code 210 in an electronic image type based on the received second identification information. Here, the identification code generator 320 also receives the first identification information, that is, the information about the user 100, from the security management server 310, and may generate the 2D identification code 210 in consideration of the information about the user 100 of the belongings 200.

In addition, an anti-counterfeit/anti-forge algorithm or an encryption key algorithm may be applied to the 2D identification code 210, thereby preventing counterfeit, forge or illegal copy. For example, in order to prevent counterfeit or forge, a special blocking layer may be coated on or attached to one or both surfaces of the 2D identification code 210. The special blocking layer may be configured to allow only the light having a predetermined wavelength to pass, thereby enabling the 2D identification code 210 to be read by the reader 340 while not being visually identified.

In addition, the 2D identification code 210 may be output to the identification code generator 320 or the labeling device 330 using special ink. The special ink, including photosensitive ink, may be discolored into a different color when it is exposed to the light having a predetermined wavelength or a predetermined intensity, thereby determining whether the 2D identification code 210 is illegally copied or not.

Alternatively, the 2D identification code 210 may include open information and non-open information, and an unread region of the 2D identification code 210, which is not used for reading of the reader 340, includes an encrypted key and the non-open information. Thus, a general 2D bar code reader, for example, a QR code reader application of a smart phone, may check only the open information, and the authorized reader 340 may be configured to read the non-open information For example, the open information may be information about the belongings 200, and the non-open information may be personal information about the user 100 of the belongings 200.

To this end, the reader 340 may include information about a decryption key corresponding to the encryption key of the 2D identification code 210. Accordingly, only the authorized reader 340 may be restrictively allowed to read the non-open information of the 2D identification code 210, for example, user's personal information, thereby reducing personal information leakage to the minimum.

As described above, an anti-counterfeit/anti-forge algorithm or an illegal copy prevention algorithm may be applied to the 2D identification code 210, thereby preventing the user 100 from illegally copying, counterfeiting or forging the 2D identification code 210. If the 2D identification code 210 is counterfeited/forged or copied, the reader 340 reads the counterfeited/forged or copied 2D identification code 210, and the security management server 310 determines that the current situation is abnormal to take a proper follow-up measure.

The generated 2D identification code 210 may be transmitted to the labeling device 330. The labeling device 330 may output the 2D identification code 210 in an electronic image type or in an attachable or insertable type, such as a sticker. For example, the labeling device 330 may be a bar code printer and may print the 2D identification code 210 in such a type as a sticker.

The printed 2D identification code 210 may be in a label type, and may be attached or inserted to a predetermined location of the belongings 200 by the security manager or the user 100. For example, the belongings 200 may be a photographing device of a camera or a smart phone, or a storage device such as a USB, a flash drive, or a disk.

The label having the 2D identification code 210 printed thereon may be attached to an outer portion of the belongings 200 or to an inner portion of the belongings 200. For example, in order to simplify a security check procedure for a regular worker who enters and exits from the B region (secure region) everyday, once the label having the 2D identification code 210 printed thereon is issued one time, it can be continuously reusable unless it is damaged. To this end, the label may be attached to an internal space of the belongings 200, for example, a battery case embedded in a mobile phone, thereby preventing or suspending the label from being damaged. In addition, the 2D identification code 210 may include information about the term of validity, so that it can be effectively read within the term of validity. If the term of validity expires, a new 2D identification code 210 may be issued to the belongings 200.

If the label is detached from the belongings 200, the 2D identification code 210 may be damaged so as to maintain information about the detachment of the label.

The reader 340 may read the user identification tag 110 and/or the 2D identification code 210, may generate read data and may transmit the read data to the security management server 310.

The reader 340 may read the user identification tag 110 and/or the 2D identification code 210 in a state in which it is spaced a predetermined distance or greater apart from the blocking device 350, for example, in close proximity to the blocking device 350. The reader 340 may identify the user identification tag 110 of the user who continuously passes and/or the 2D identification code 210 for the belongings 200 possessed by the user 100.

While the user 100 enters and exits from the secure region, the information read by the reader 340 may be transmitted to the security management server 310. In particular, during the entrance procedure, the security management server 310 may check whether the read information and the pre-stored first and/or second identification information are identical with each other.

For example, if the 2D identification code 210 generated during the entrance procedure is not matched with the second identification information due to errors or damages occurring to the identification code generator 320 and/or the labeling device 330, it is determined that the 2D identification code 210 is damaged, and information about the damage of the 2D identification code 210 is transmitted to the security management server 310, followed by taking a follow-up measure, such as reissue of the 2D identification code 210.

Referring to FIGS. 6 and 7, the user 100 who intends to enter the A region (unsecure region) may cause the reader 340 to read the first identification information by allowing the user identification tag 110 including the user's identification information to pass the reader 340. The issuing of the user identification tag 110 may be performed prior to the entrance procedure. The first identification information may be transmitted to the security management server 310.

In addition, the security management server 310 may receive the second identification information, that is, the information about the belongings 200. The second identification information may be directly input to the security management server 310 by the user 100 or a security manager (not shown). Alternatively, a bar code, etc. pre-attached to the belongings 200, may be read by the reader 340 to read the second identification information, that is, the information about the belongings 200.

After receiving the first identification information and the second identification information, the security management server 310 may perform an operation of mapping the first identification information with the second identification information, and stores mapped data in a storage space, such as a database, to later be used during the exit procedure.

Thereafter, the security management server 310 may transmit the first identification information and/or the second identification information to the identification code generator 320 and may generate the 2D identification code 210. The labeling device 330 may output the label. In some other embodiments, the labeling device 330 may further perform a step of attaching the output label to the belongings 200. The output 2D identification code 210 may include second identification information and may further include some of the first identification information.

The output 2D identification code 210 may be attached to a predetermined location of the belongings 200 to then manage the belongings 200 as secured belongings.

In the secured belongings management system according to another embodiment of the present invention, the first identification information about the user 100 of the belongings 200 may include a user identification tag 110, a 2D identification code 210 attachable to the belongings 200 and including second identification information that is information about the belongings 200, a reader 340 reading the user identification tag 110 and the 2D identification code 210 and extracting first identification information and second identification information to generate read information, and a security management server 310 receiving and analyzing the read information. Here, the first identification information includes third identification information that is the information about the belongings 200. The security management server 310 determines whether the third identification information of the first identification information and the second identification information are identical with each other.

According to the embodiment of the present invention, a predetermined encryption algorithm may be applied to the first identification information to the third identification information. In addition, the security management server 310 may include a decryption algorithm for decoding the encryption algorithm.

In the embodiment of the present invention, the third identification information may mean information about the belongings 200 included in the first identification information, that is, some of the second identification information.

The system according to the embodiment of the present invention may further include a blocking device 350 that selectively prevents the user 100 of the belongings 200 from entering and exiting from the secure area. If the third identification information and the second identification information are not identical with each other, the security management server 310 may actuate the blocking device 350. For example, if the second identification information is not read by the reader 340, the security management server 310 may actuate the blocking device 350.

In addition, the second identification information may further include the information about the user 100 of the belongings 200. The security management server 310 may determine whether the first identification information and the information about the user 100 of the second identification information are identical with each other or not.

In detail, referring to FIGS. 8 and 9, when the user 100 who possesses the belongings 200 with the 2D identification code 210 attached thereto intends to move from a 'B' region (secure region) to an 'A' region (unsecure region) (that is, exist procedure), the user identification tag 110 and the 2D identification code 210 are allowed to pass the reader 340, thereby causing the reader 340 to read the first identification information and the second identification information.

The reader 340 may transmit the read first and second identification information to the security management server 310.

Next, the security management server 310 may determine whether the read first identification information and the read second identification information are identical with each other or not. In this procedure, the security management server 310 may further perform an operation of checking integrity of the first identification information and the second identification information using a predetermined algorithm. This procedure may include the security management server 310 determining the information about the belongings 200 included in the read first identification information, and determining the information about the user 100 included in the read second identification information.

Further, the first identification information and the second identification information previously read during the entrance procedure may be compared with the first identification information and the second identification information presently read during the exit procedure to determine whether they are identical with each other.

If the first identification information and the second identification information are identical with other, the security management server 310 may transmit a security command signal to the blocking device 350 to create a security canceled state, thereby allowing the user 100 to pass the blocking device 350 and to move to the A region (unsecure region).

If the first identification information and the second identification information are not identical with other, the security management server 310 may transmit a security command signal to the blocking device 350 to maintain a security blocked state to then take a follow-up measure.

Figure 10:
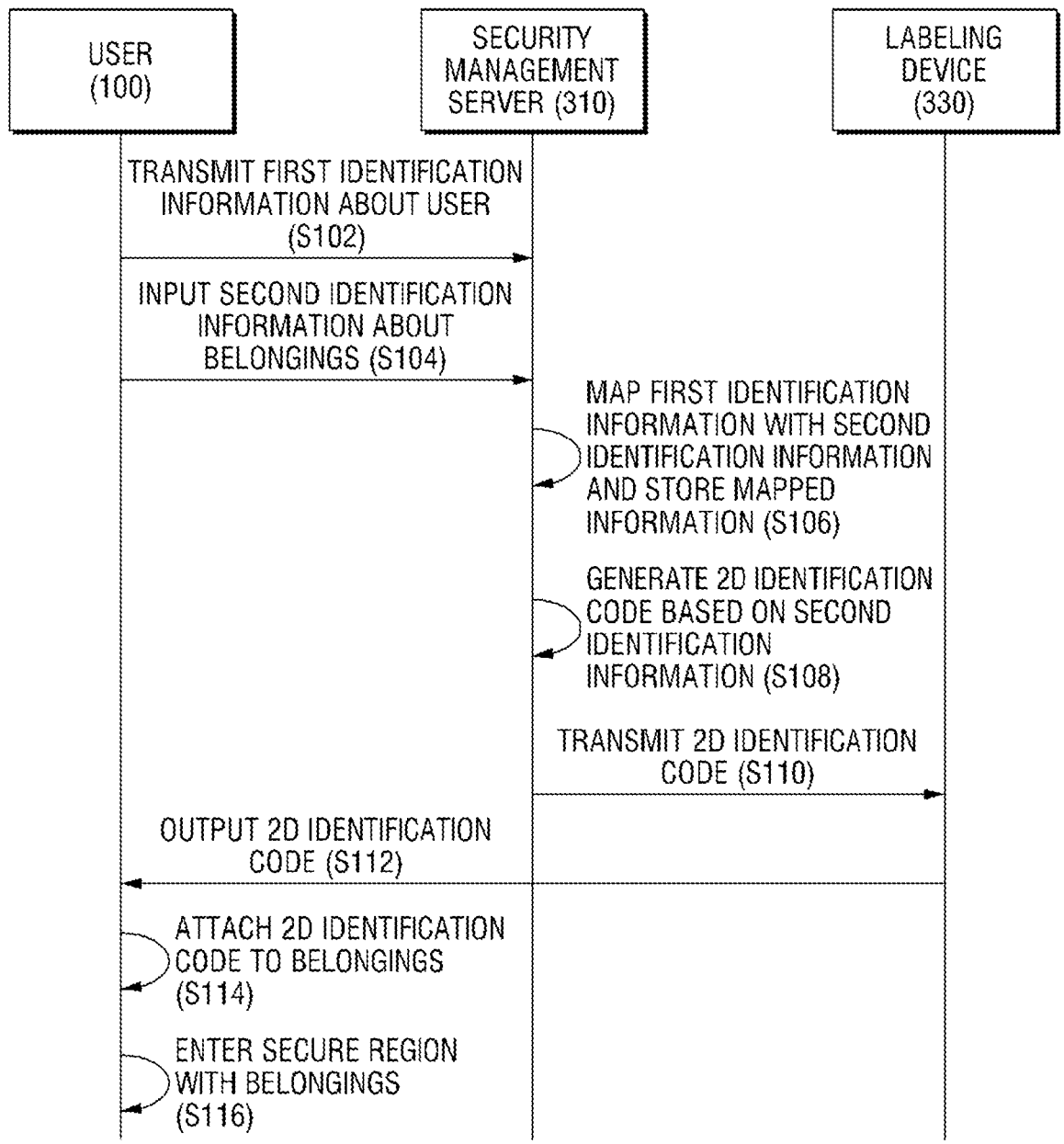
FIG. 10 is a flow diagram illustrating entrance management in a method for managing secured belongings according to an embodiment of the present invention.
Figure 11:
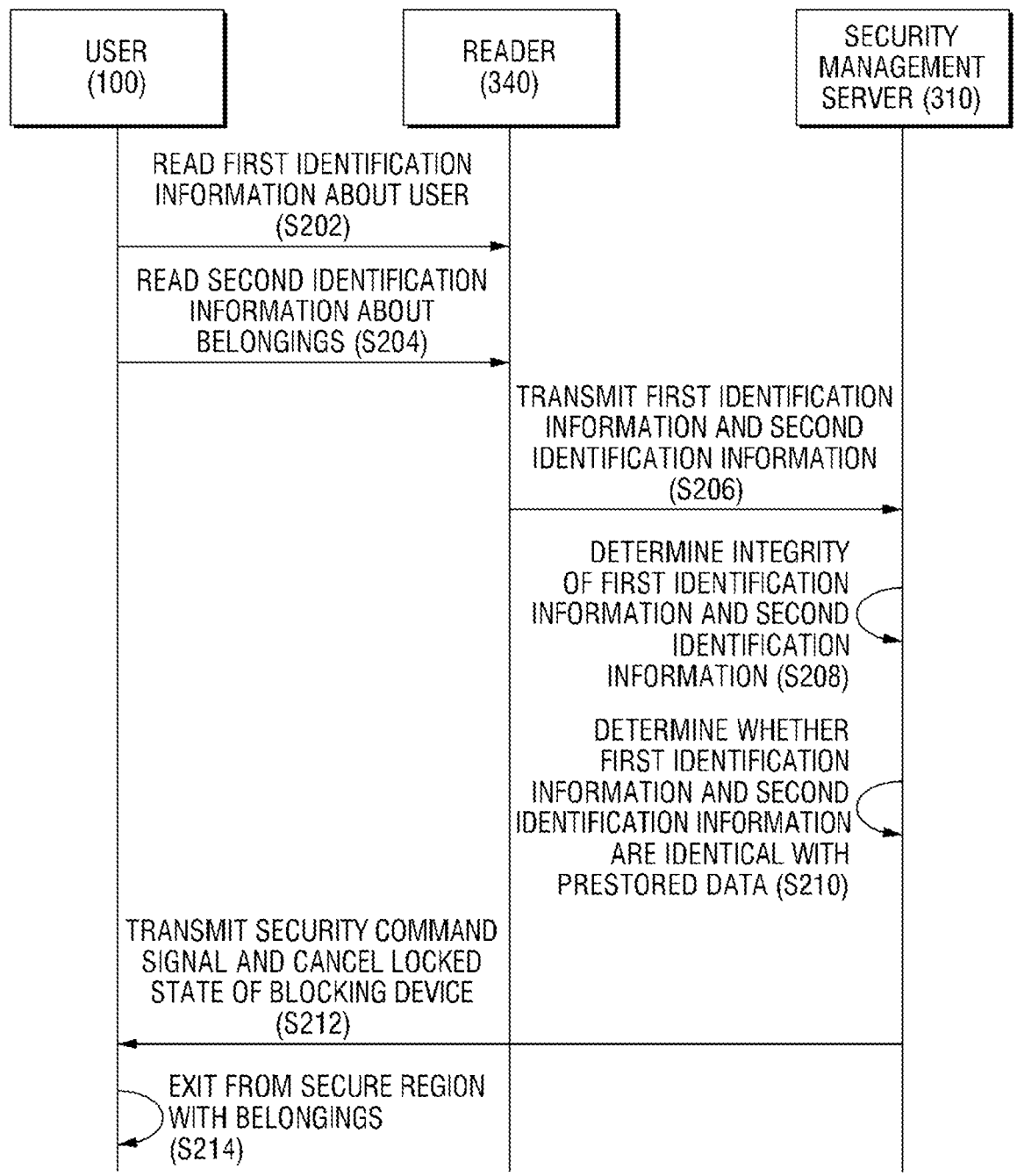
FIG. 11 is a flow diagram illustrating exit management in a method for managing secured belongings according to an embodiment of the present invention.

Hereinafter, a method for managing secured belongings according to an embodiment of the present invention will be described with reference to FIGS. 10 and 11. FIG. 10 is a flow diagram illustrating entrance management in a method for managing secured belongings according to an embodiment of the present invention, and FIG. 11 is a flow diagram illustrating exit management in a method for managing secured belongings according to an embodiment of the present invention.

The secured belongings management method according to an embodiment of the present invention may include receiving a request for entrance to a secure region from a user of belongings, recognizing first identification information including personal information about the belongings' user and first information about the belongings, extracting second identification information that is second information about the belongings, generating a 2D identification code including the second identification information, attaching the 2D identification code to the belongings, and mapping the first identification information with the second identification information and storing the same.

In addition, as described above, the secured belongings management method according to an embodiment of the present invention may further include reading 2D identification code and determining whether the read information and the second identification information are identical with each other. The 2D identification code may be inserted into an inner portion of the belongings. In addition, the belongings may include at least one of a photographing device and a storage device.

Referring to FIG. 10, the belongings' user 100 who intends to enter the secure region during an entrance procedure transmits first identification information, that is, information about the user 100, to the security management server 310 through a device, such as a reader, or by being directly input by the user 100 or a manager (S102). Alternatively, second identification information about the belongings possessed by the user may be transmitted simultaneously or separately to the security management server 310.

After receiving the first identification information and the second identification information, the security management server 310 may map the first identification information with the second identification information and may store the mapped information (S106). A 2D identification code may be stored based on the received second identification information (S108). The generated 2D identification code may be transmitted to the labeling device 330 (S110). The labeling device 330 may output the 2D identification code in an attachable type, such as in the form of a sticker (S112). The user 100 who has received the 2D identification code in a printed label form may directly attach the 2D identification code to the belongings through a manual operation (S114). In some other embodiments, the labeling device 330 may automatically perform an operation of attaching the label (S116).

If the entrance procedure is completed in such a manner, the belongings' user 100 may be allowed to enter the secure region with the belongings.

In addition, if a request for exit to the secure region is received from the belongings' user 100, the secured belongings management method according to an embodiment of the present invention may further include reading the first identification information and the second identification information and determining whether first information of the first identification information and the second identification information are identical with each other. If the first identification information and the second identification information are not identical with each other, the secured belongings management method according to an embodiment of the present invention may further include preventing the belongings' user from entering or existing from the secure region. If the second identification information is not read, the secured belongings management method according to an embodiment of the present invention may further include preventing the belongings' user from entering or existing from the secure region.

Referring to FIG. 11, after completing the operation in the secure region, the user 100 may make a request for exit from the secure region. The first identification information about the user 100 and the second identification information may be transmitted to the security management server 310 through the reader 340 (S202, S204 and S206). After receiving the first identification information and the second identification information through the reader 340, the security management server 310 determines integrity of the first identification information and the second identification information (S208), and may determine whether the first identification information and the second identification information are identical with pre-stored data (S210).

If the data previously registered during the entrance procedure is identical with the data currently read during the exit procedure, a locked state of the blocking device may be canceled (S212). The user 100 may exist from the secure region with belongings (S214).

As described above, according to the embodiments of the present invention, unlike the conventional security sticker, the system includes a security sticker including a new identification code in a two-dimensional (2D) bar code form including information about a user who enters or exits from the secure region and/or information about the belongings, thereby achieving reinforced security. In addition, in a case where a user who enters or exits from a secure region optionally detaches an identification code or a security sticker from the secured belongings, the 2D identification code may be damaged, so that it cannot be scanned by a reader, thereby easily determining whether the secured belongings are counterfeited or forged or not.

Further, personal information about the user and information about the belongings are mapped together and managed at the same time, thereby easily determining whether the secured belongings taken in or out by a user who enters or exits from a secure region are tampered and used to then be discarded or counterfeited to be reattached.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A system intended for use in managing belongings, the system comprising:
   a user identification tag including first identification information about a user of the belongings;
   an identification code generator configured to generate a two-dimensional (2D) identification code including second identification information based on information about the belongings;
   a labeling device configured to output a label with the 2D identification code; and
   a security management server configured to receive the first identification information and the second identification information simultaneously, generate and store a mapping of the received first identification information with the received second identification information;
   wherein the label is configured so that when the label is detached from the belongings, the 2D identification code is damaged.

2. The system of claim 1, further comprising:
   a reader configured to read the 2D identification code of the label and to output read information;
   the security management server being further configured to determines whether the read information matches the second identification information.

3. The system of claim 2, wherein the reader is further configured to also read a damaged 2D identification code to obtain damaged information, and to output the damaged information to the security management server.

4. The system of claim 1, wherein the identification code generator is further configured to generate the 2D identification code to include, in the second identification information, information about the user of the belongings.

5. The system of claim 1, wherein:
   the label comprises a blocking layer over a surface of the 2D identification code; and
   the blocking layer blocks light from passing except for light having a predetermined wavelength.

6. The system of claim 1, wherein the labeling device is further configured to output the 2D identification code to the label using photosensitive ink that becomes discolored when exposed to light having a predetermined wavelength.

7. The system of claim 1, wherein:
   the identification code generator is further configured to generate the 2D identification code so as to include open information and non-open information; and
   the 2D identification code is generated so as to have an unread region with an encrypted key and the non-open information.

8. A system intended for use in managing belongings, the system comprising:
   a user identification tag including first identification information about a user of the belongings, the first identification information including respective identification information about the belongings;
   a two-dimensional (2D) identification code, on an object configured so as to be attachable to the belongings, and including second identification information based on information about the belongings;
   a reader configured to:

read the user identification tag and the 2D identification code to obtain extracted information including the first identification information and the second identification information; and generate read information based on the extracted information; and a security management server receiving and analyzing the read information including the first identification information and the second identification information, and generating and storing a mapping of the received first identification information with the received second identification information;

wherein the security management server is further configured to determine whether the respective identification information about the belongings, of the first identification information, matches the second identification information.

9. The system of claim 8, wherein the security management server is further configured to decode one or more of the first identification information and the second identification information, using a decryption algorithm.

10. The system of claim 8, further comprising a blocking device configured to be actuated by the security management server so as to selectively hinder movement of the belongings; wherein the security management server is further configured to actuate the blocking device in response to a determination that the respective identification information about the belongings, of the first identification information, does not match the second identification information.

11. The system of claim 10, wherein the security management server is further configured to actuate the blocking device in response to a determination that the second identification information is not read by the reader.

12. The system of claim 8, wherein:
the second identification information further includes information about the user of the belongings; and
the security management server is further configured to determine whether the first identification information about the user matches the information about the user in the second identification information.

13. The system of claim 8, wherein:
the object comprises a blocking layer over a surface of the 2D identification code;
the blocking layer blocks light from passing except for light having a predetermined wavelength to pass; and
the reader generates the light having the predetermined wavelength.

14. The system of claim 8, wherein the 2D identification code is manifested on the object using photosensitive ink that becomes discolored when exposed to light, having a predetermined length.

15. The system of claim 8, wherein:
the 2D identification code includes open information, non-open information, and an unread region;
the unread region of the 2D identification code includes an encrypted key and the non-open information; and
the reader includes information about a decryption key corresponding to the encryption key.

16. A method for managing secured belongings, the method comprising:
receiving a request for entrance to a secure region from a user;
obtaining first identification information, including:
personal information about the user, and
first information about belongings, of the user, to be stored;
obtaining second identification information including second information about the belongings;
using a two-dimensional (2D) identification code generator to generate a 2D identification code including the second identification information;
outputting the 2D identification code on an object and attaching the object with the 2D identification code to the belongings; and
receiving, in a data storage of a computer, the first identification information and the second identification information simultaneously, generating and storing, in the data storage of the computer, a mapping of the received first identification information with the received second identification information.

17. The method of claim 16, further comprising reading the 2D identification code and determining whether the read information matches the second identification information.

18. The method of claim 16, further comprising:
receiving a request from a user to exit from the secure region with the belongings;
in response to the request, reading the first identification information and the second identification information; and
determining whether the first information in the first identification information and the second identification information match.

19. The method of claim 18, further comprising preventing the belongings' user from entering or exiting from the secure region, when the first identification information and the second identification information do not match.

20. The method of claim 18, further comprising preventing the belongings' user from entering or exiting from the secure region when the second identification information is not read.

* * * * *